(12) United States Patent
Naik et al.

(10) Patent No.: US 10,284,753 B1
(45) Date of Patent: May 7, 2019

(54) VIRTUAL REALITY MEDIA CONTENT GENERATION IN MULTI-LAYER STRUCTURE BASED ON DEPTH OF FIELD

(71) Applicant: SONY CORPORATION, Tokyo (JP)

(72) Inventors: Sunilkumar Naik, Bangalore (IN); Shejashree Shekhar Shetty, Bangalore (IN); Prithwijit Sarkar, Bangalore (IN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/026,391

(22) Filed: Jul. 3, 2018

(51) Int. Cl.
| | |
|---|---|
| *G02B 27/01* | (2006.01) |
| *G06T 7/593* | (2017.01) |
| *H04N 5/222* | (2006.01) |
| *H04N 13/117* | (2018.01) |
| *H04N 13/279* | (2018.01) |

(52) U.S. Cl.
CPC .......... *H04N 5/2226* (2013.01); *G06T 7/596* (2017.01); *H04N 13/117* (2018.05); *H04N 13/279* (2018.05); *G02B 2027/0127* (2013.01)

(58) Field of Classification Search
None
See application file for complete search history.

(56) References Cited

U.S. PATENT DOCUMENTS

| 6,141,034 A | 10/2000 | McCutchen |
| 9,615,177 B2 | 4/2017 | Englert et al. |
| 2017/0244948 A1 | 8/2017 | Pang et al. |
| 2018/0270464 A1* | 9/2018 | Harviainen .......... H04N 13/128 |

FOREIGN PATENT DOCUMENTS

WO 2017/139667 A1 8/2017

* cited by examiner

*Primary Examiner* — Frank S Chen
(74) *Attorney, Agent, or Firm* — Chip Law Group

(57) ABSTRACT

A virtual reality (VR) device stores an encoded 360° VR video that includes a sequence of video fragments. Each video fragment includes a plurality of flat layers and each flat layer is at least one equirectangular image frame associated with an image metadata. The VR device is configured to render the plurality of flat layers in each video fragment as a plurality of concentric spherical layers projected at a plurality of depth values. The VR device is further configured to receive a plurality of user inputs associated with a modification of a set of attributes in the image metadata. The VR device is further configured to generate a modified image metadata for different concentric spherical layers and control playback of each video fragment in accordance with the modified image metadata for the different concentric spherical layer.

20 Claims, 9 Drawing Sheets

VIRTUAL REALITY MEDIA CONTENT GENERATION IN MULTI-LAYER STRUCTURE BASED ON DEPTH OF FIELD

CROSS-REFERENCE TO RELATED APPLICATIONS/INCORPORATION BY REFERENCE

None.

FIELD

Various embodiments of the disclosure relate to immersive virtual reality (VR) devices and technologies. More specifically, various embodiments of the disclosure relate to virtual reality media content generation in a multi-layer structure based on depth of field.

BACKGROUND

Recent advancements in the field of virtual reality (VR)-based devices have increased user engagement with VR videos on different types of VR devices, for example, VR game consoles, VR head mounted devices (HMDs), VR-based television screens, and the like. However, most of the existing 360 videos or VR videos have flat structure, in which different components, such as user interfaces (UIs), text, subtitles, computer-generated imagery (CGI), buttons, animations, and overlay graphics, are merged and overlapped into the single layer 360 video. Current video formats for 360 videos or immersive VR videos and VR rendering mechanisms limits user interactions and any change in depth values for the different components of the 360 videos or VR videos.

Further limitations and disadvantages of conventional and traditional approaches will become apparent to one skill in the art, through comparison of described systems with some aspects of the present disclosure, as set forth in the remainder of the present application and with reference to the drawings.

SUMMARY

A virtual reality (VR) device and a method for VR media content generation in a multi-layer structure based on depth of field substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a method and virtual reality (VR) device for VR media content generation in a multi-layer structure and interactive playback of the generated VR media content in the multi-layer structure. The disclosed method and the VR device provides a new VR video format that is capable of packaging images/videos in a concentric 360 spherical format in a multi-layer structure. Further, the disclosed method and the VR device provides a rendering mechanism that provides an enhanced depth sense for the rendered VR media content and enables user interaction with different layers of the multi-layer structure of the rendered VR media content.

Figure 1:
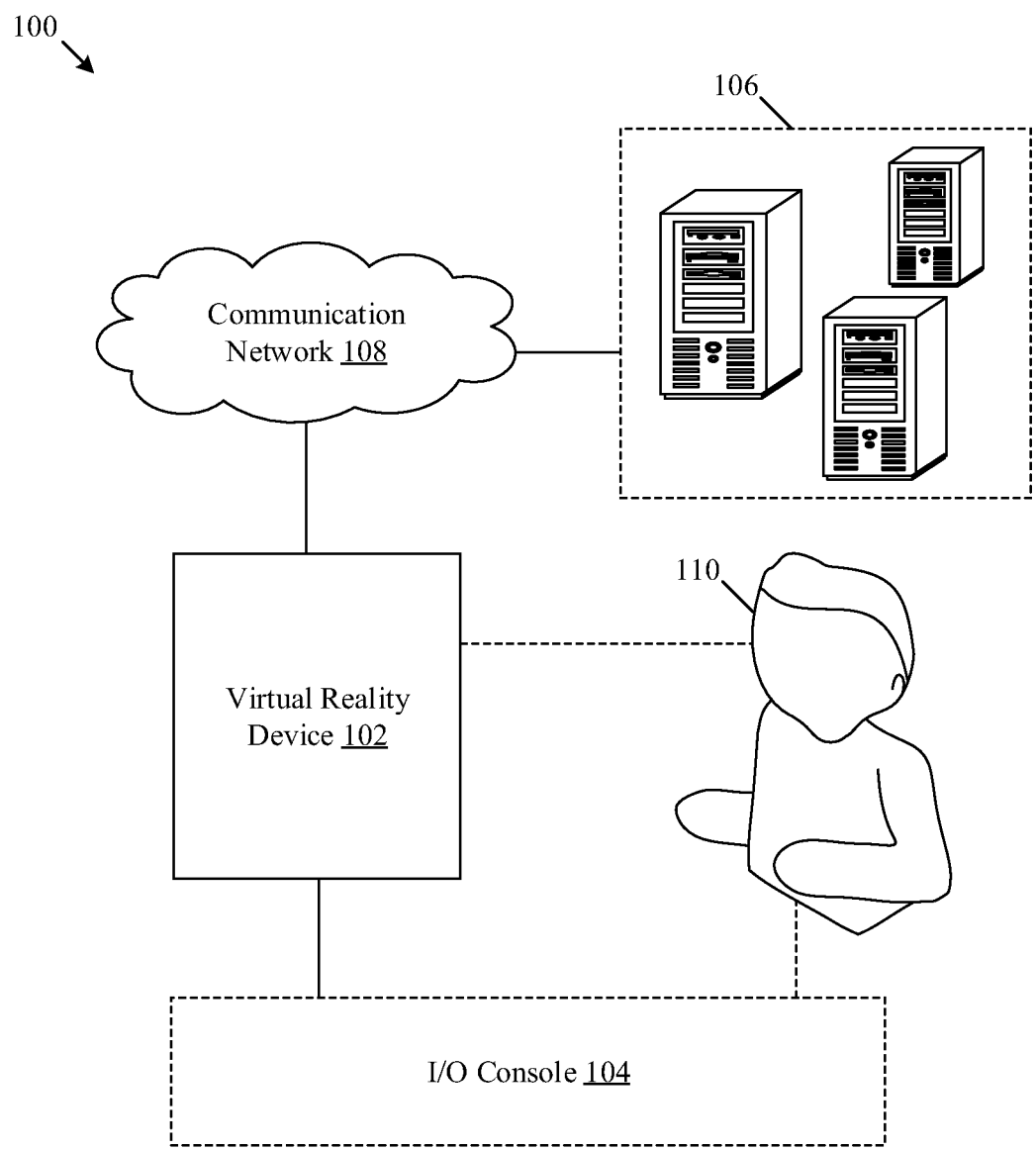
FIG. 1 is a block diagram that illustrates an exemplary network environment for virtual reality (VR) media content generation in a multi-layer structure and interactive playback at a virtual reality device, in accordance with an embodiment of the disclosure.

FIG. 1 is a block diagram that illustrates an exemplary network environment for virtual reality (VR) media content generation in a multi-layer structure and interactive playback at a virtual reality device, in accordance with an embodiment of the disclosure. With reference to FIG. 1, there is shown a network environment 100 that includes a VR device 102, and a media server 106 communicatively coupled to the VR device 102, via a communication network 108. In some embodiments, the VR device 102 may be communicatively coupled to an Input/output (I/O) console 104. A user 110 may be engaged with the VR device 102 and the I/O console 104.

The VR device 102 may comprise suitable logic, circuitry, and interfaces that may be configured to control playback of 360° VR videos in a multilayered format such that each layer is rendered at a different depth of field from a user viewpoint at the VR device 102. The VR device 102 may include a dedicated video codec, a 3D VR display, an I/O interface, memories, a graphics accelerator or a dedicated graphical processing unit (GPU), sensor circuitries, and other computational circuitries for an offline/online playback of the 360° VR video at the VR device 102. The VR device 102 may be implemented as a VR support system, for example, a projection-based VR support system, a wearable support system, a monitor-based VR support system, and the like. Examples of the VR device 102 may include, but are not limited to, a cave automatic virtual environment (CAVE) display system, a head-mounted display (HMD), a boom-mounted display, a fish-tank VR display, a holobench, a panoramic VR display, and a wearable VR glass.

The I/O console 104 may comprise suitable logic, circuitry, interfaces that may be configured to receive from a user (for example, the user 110) and provide a plurality of user inputs to the VR device 102 to facilitate user-controlled interactivity with the playback of the 360° VR video at the VR device 102. The I/O console 104 may include a plurality of input interfaces, for example, buttons and/or joysticks for stroke-based and/or movement-based inputs, gesture sensors, body posture sensors, touchscreens, and the like. Example of the I/O console 104 may include, but are not limited to, game controllers, joysticks, mouse, keyboards, depth sensors, gesture-based controllers, and the like. It may be noted that the I/O console 104 has been shown as a peripheral console device for the VR device 102. However, the disclosure may not be so limited and the I/O console 104 or the functionalities of the I/O console 104 may be integrated into a single VR device, such as the VR device 102, without a deviation from the scope of the disclosure.

The media server 106 may comprise suitable logic, circuitry, interfaces that may be configured to store and communicate encoded 360° VR videos to the VR device 102 for playback at the VR device 102. The media server 106 may include suitable packages to assemble VR media content and other non-VR content (for example, subtitles, graphic items, 3D audio resources, animations, CGI, etc.) as a plurality of video fragments of the encoded 360° VR video. The media server 106 may further include audio and video codecs to encode a plurality of flat layers in each video fragment for delivery to the VR device 102. Although not mentioned, instead of a single media server, the media server 106 may be a distributed network of media servers that share different VR content and non-VR content across different regions that may be identified by different demographic factors, for example, all the content specific to Indian users may be stored at a dedicated server for Indian users.

The communication network 108 may comprise suitable logic, circuitry, and interfaces that may be configured to provide a plurality of network ports and a plurality of communication channels for transmission and reception of data. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 108 may be associated with an application layer for implementation of communication protocols based on one or more communication requests from at least one of the one or more communication devices. The communication data may be transmitted or received, via the communication protocols. Examples of the communication protocols may include, but are not limited to, HTTP (Hypertext Transfer Protocol), FTP (File Transfer Protocol), SMTP (Simple Mail Transfer Protocol), DNS (Domain Network System) protocol, and CMIP (Common Management Interface Protocol).

In accordance with an embodiment, the communication data may be transmitted or received via at least one communication channel of the plurality of communication channels in the communication network 108. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN) and Wireless Wide Area Network (WWAN). Additionally, the wired channel may be selected on the basis of a bandwidth criteria. For example, an optical fiber channel may be used for a high bandwidth communication. Further, a coaxial cable-based or Ethernet-based communication channel may be used for moderate bandwidth communication.

In operation, a user input may be received through a user interface (UI) or the I/O console 104 as a request for playback of a 360° VR video at the VR device 102. In accordance with an embodiment, the request for the playback may be received by the media server 106 in absence of a locally stored 360° VR video in the VR device 102. In some cases, the request may be associated with a set of user preferences for a type of content that the user 110 may intend to engage in an immersive environment. The media server 106 may be configured to package VR content overlaid with layers of non-VR content in accordance with the set of user preferences. In some implementations, the media server 106 may be configured to provide pre-packaged 360° VR video to the VR device 102, via the communication network 108.

In accordance with another embodiment, the VR device 102 may be configured to retrieve the 360° VR video from the VR device 102 or the media server 106. The 360° VR video may be stored as an encoded 360° VR video at the VR device 102. The 360° VR video may be encoded in accordance with a video format that stores the VR media content (for example, movies, CGI, or gameplay) and non-VR content (for example, overlay graphics, subtitles, or animations) as a sequence of video fragments.

The encoded 360° VR video may include a sequence of video fragments. Each video fragment of the sequence of video fragments may include a plurality of flat layers. Each flat layer of the plurality of flat layers may include at least one equirectangular image frame. Hereinafter, the at least one equirectangular image frame may be referred to as an equirectangular image frame for a single flat layer in a video fragment of the 360° VR video. Each equirectangular image frame of a flat layer may be further associated with an image metadata. The image metadata may include layer information associated with a layer type, a depth value, a three dimensional (3D) audio position value, an alpha value, and media player-specific information. Such layer information may be further utilized to render different flat layers of 360° VR video at the VR device 102.

Figure 3A:
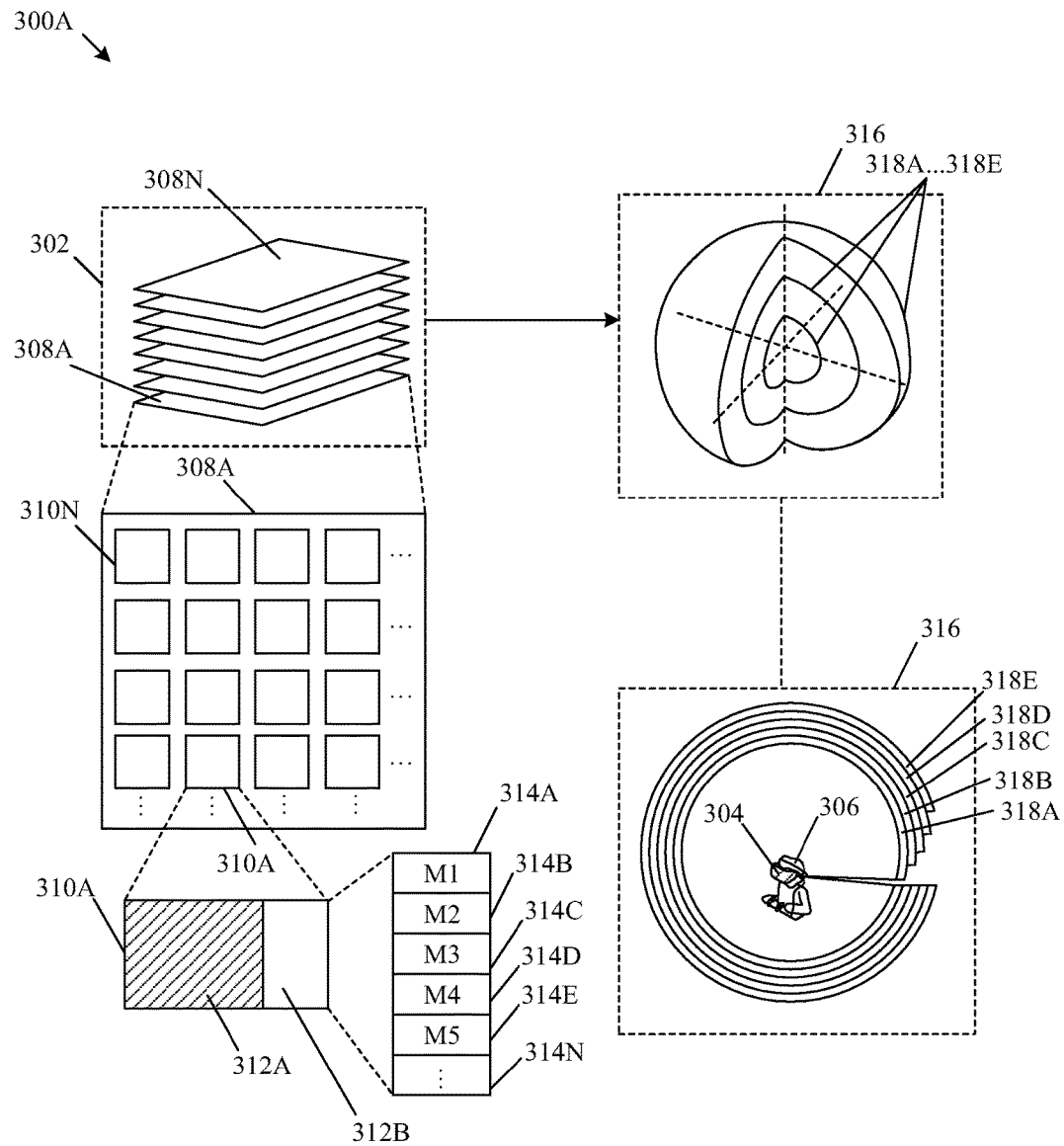
FIG. 3A is an exemplary scenario that illustrates a video format of a 360° VR video in a multi-layer structure that is rendered at the VR device of FIG. 2A, in accordance with an embodiment of the disclosure.
Figure 3B:
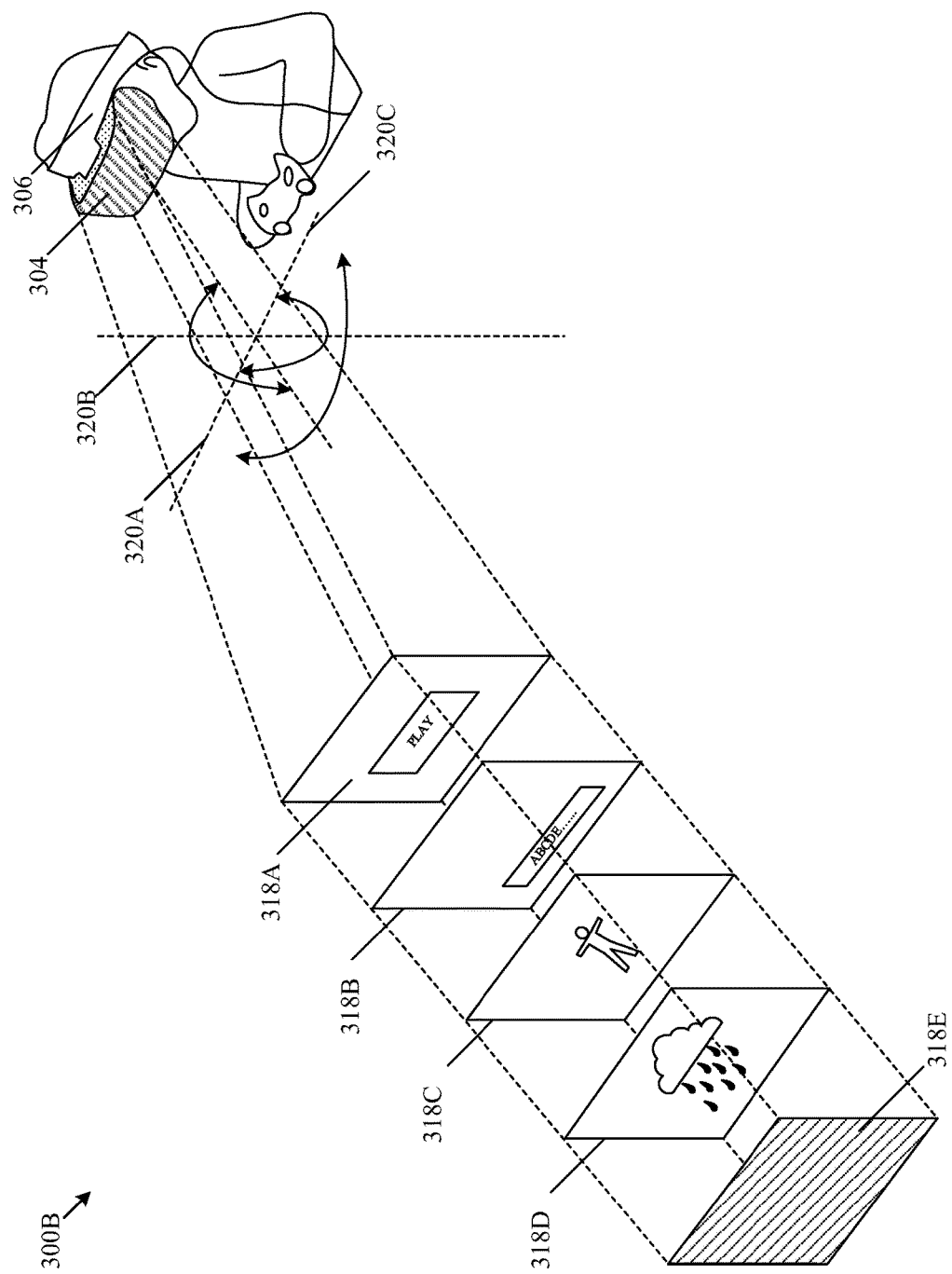
FIG. 3B is an exemplary scenario that illustrates a view of different rendered layers of 360° VR video at an HMD device worn by a user, in accordance with an embodiment of the disclosure.

The VR device 102 may be configured to generate a decoded 360° VR video by decompression of the plurality of flat layers and the image metadata for each flat layer of each encoded video fragment of the encoded 360° VR video. The VR device 102 may be configured to render the plurality of flat layers in each video fragment of the encoded 360° VR video at the VR device 102. The plurality of flat layers may be rendered as a plurality of concentric spherical layers that may be projected by the VR device 102 at a plurality of depth values with respect to a user viewpoint (as shown in FIG. 3A and FIG. 3B). A specification to compute rendered models for the plurality of flat layers may be provided in the image metadata for each flat layer of the plurality of flat layers.

In accordance with an embodiment, the decoded 360° VR video may be rendered differently in accordance with a type of VR environment that is rendered for the user 110 (or a group of users). The type of VR environment may include a fully immersive VR environment and a partially immersive VR environment. For example, the fully immersive environment may correspond to a scenario where the 360° VR video is rendered on the VR device 102 such that a user wearing the VR device 102 may experience a self-deportation into an immersive and interactive VR environment created through rendering of the 360° VR video. The self-deportation experience may also be referred to as a first person view of the VR environment, where the user 110 may directly engage with different components of the VR environment. The partially immersive VR environment may correspond to a scenario where the 360° VR video is rendered on the VR device 102 such that a user wearing the VR device 102 may experience a guided and/or instructed engagement into an immersive and interactive VR environment created through rendering of the 360° VR video. The guided and/or instructed engagement may also be referred to as a second or a third person view of the VR environment, where the user 110 may passively engage with different components of the rendered VR environment.

The type of VR environment may further depend on at least a field-of-view for a scene at the VR device 102 with respect to the user viewpoint. The field-of-view may vary with different types of VR devices in use by the user 110. For example, a field of view for a 3D computer monitors, HMDs/Boom-Displays, Holobenches, wall mounted displays, panoramic displays, and six-sided caves, has been known to lie in a range of "20°-40°", "30°-80°", "80°-120°", "100°-140°", "160°-180°", and up to "360°", respectively. Therefore, HMDs, Boom-displays, and six-sided caves may be utilized as the VR device 102 to provide a fully immersive environment to the user 110, for the rendered 360° VR video. On the contrary, the 3D computer monitors, the Holobenches, the panoramic screens and "3-5" sided caves may be utilized as the VR device 102 to provide a partially immersive environment to the user 110, for the rendered 360° VR video.

In accordance with an embodiment, the VR device 102 may be further configured to modify different attributes associated with the rendered 360° VR video. The different attributes associated with the rendered 360° VR video are specified in the image metadata for each layer of the rendered 360° VR video. The different attributes associated with the rendered 360° VR video are modified in response to user input at the time of viewing of the rendered 360° VR video. Such modification in the different attributes associated with the rendered 360° VR video provides an interactivity with the different elements viewed at different depth (i.e. depth of field from user's viewpoint) in the rendered 360° VR video. Further, such modifications may be done to personalize the immersive experience for the user 110 with the playback of the 360° VR video at the VR device 102.

The VR device 102 may be further configured to receive a plurality of user inputs. The plurality of user inputs may be associated with a modification of a set of attributes in the image metadata associated with at least one concentric spherical layer of the plurality of concentric spherical layers in each video fragment of the rendered 360° VR video at the VR device 102. Hereinafter, the at least one concentric spherical layer may be referred to as user-selected concentric spherical layers. The VR device 102 may be configured to generate a modified image metadata for the user-selected concentric spherical layer of the plurality of concentric spherical layers in each video fragment of the rendered 360° VR video. The modified image metadata for the user-selected concentric spherical layers may be generated based on modification of the set of attributes of the image metadata associated with the user-selected concentric spherical layers of each video fragment of the rendered 360° VR video.

The VR device 102 may be configured to utilize the modified image metadata to re-render the user-selected concentric spherical layers at the VR device 102. Alternatively stated, the VR device 102 may be configured to control playback of each video fragment rendered as the plurality of concentric spherical layers. The playback may be controlled in accordance with the modified image metadata for the user-selected concentric spherical layers of each video fragment of the rendered 360° VR video. The playback of each video fragment may be controlled based on a user-selection of the set of attributes in the image metadata. In some embodiments, the controlled playback of each video fragment in accordance with the modified image metadata may correspond to at least one of a switch in a position, a modification of content, a modification of an audio depth perception and a direction of audio perception, or a level of transparency of different concentric spherical layers of each video fragment in the rendered 360° VR video.

In accordance with an embodiment, the encoded 360° VR video may exhibit a modularity associated with a degree by which different components of the encoded 360° VR video may be separated, recombined, or modified at the VR device 102. Thus, as a result of modularity in data structure/video format of an encoded 360° VR video, the media server 106 may broadcast a media stream of the encoded 360° VR video in accordance with targeted requirements for different types of users. Such types of users may be further identified based on different demographic factors, for example, region, religion, race, age group, gender, native language, financial conditions, and the like. For example, the content of text layer may vary (e.g. Japanese Subtitles, English Subtitles, Hindi Subtitles, etc.) in different broadcasted media stream of the encoded 360° VR video in accordance with a native language of the users that may watch the 360° VR video.

Figure 2A:
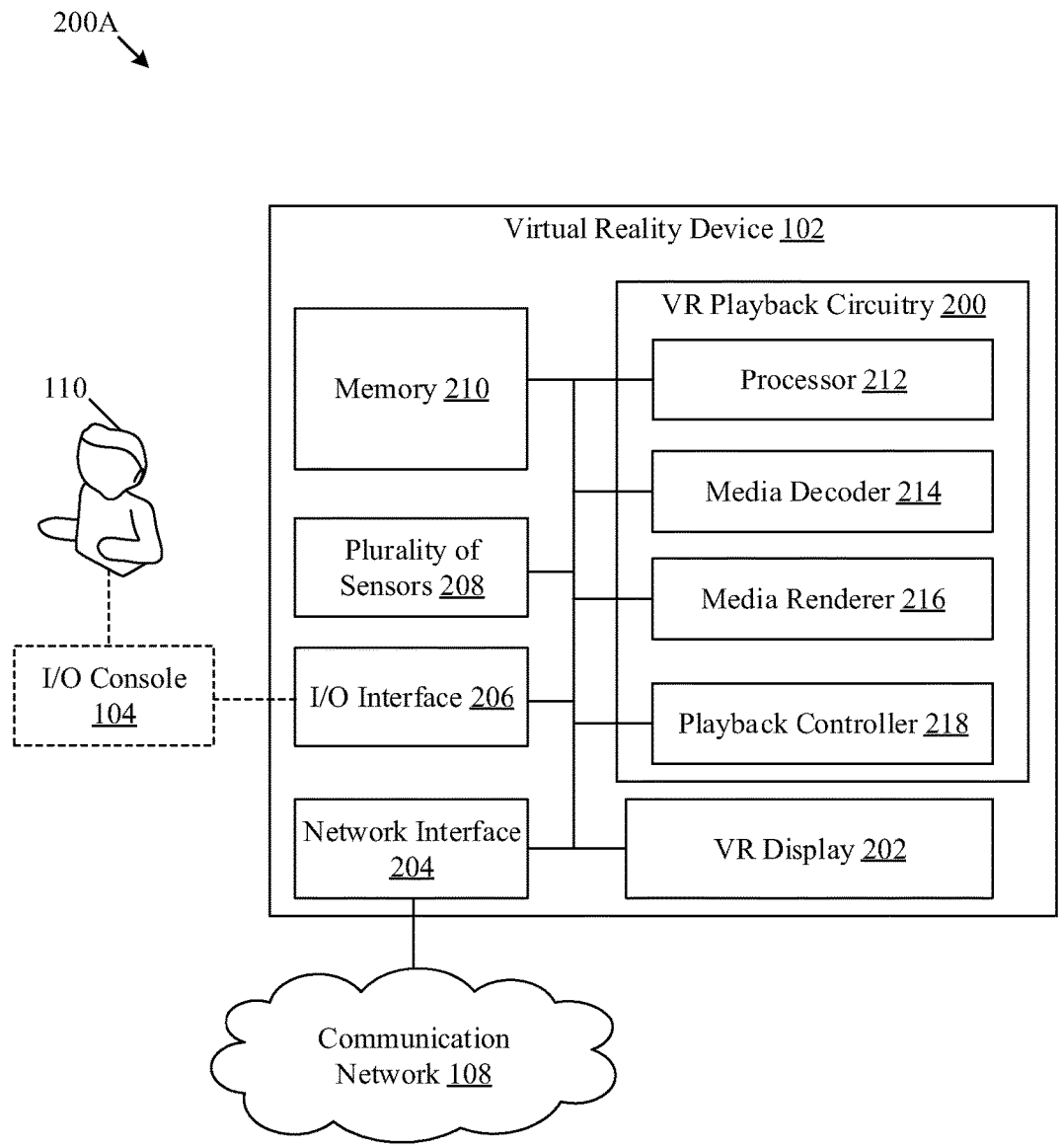
FIG. 2A is a block diagram that illustrates an exemplary VR device for VR media content generation in a multi-layer structure and interactive playback, in accordance with an embodiment of the disclosure.

FIG. 2A is a block diagram that illustrates an exemplary VR device for VR media content generation in a multi-layer structure and interactive playback, in accordance with an embodiment of the disclosure. FIG. 2A is explained in conjunction with elements from FIG. 1. With reference to FIG. 2A, there is shown a block diagram 200A of the VR device 102. The VR device 102 may include VR playback circuitry 200, a VR display 202, a network interface 204, an input/output (I/O) interface 206, a plurality of sensors 208, and a memory 210. The VR playback circuitry 200 may further include a processor 212, a media decoder 214, a media renderer 216, and a playback controller 218. Although not shown, the VR device 102 may further include other circuitries, for example, speakers, graphic accelerators, power circuits, and the like.

The VR display 202 may comprise suitable logic, circuitry, and interfaces that may be configured to display an immersive virtual environment that includes a spherical projection of a 360° VR video that is layered into multiple concentric layers. The VR display 202 may be a 3D VR screen that may display a rendered 360° VR video at an adjustable depth of field. Such 3D VR screen may be categorized based on a type of VR device 102, for example, a projection-based VR display, a wearable VR display, and an external VR display monitor. Examples of the VR display 202 may include curved display screens in HMDs and panoramic devices, flat display screens in HMDs, panoramic devices, boom-display devices, flat monitors, and the like. In accordance with an embodiment, the VR display 202 may be further realized through several known technologies such as, but not limited to, at least one of a Liquid Crystal Display (LCD) display, a Light Emitting Diode (LED) display, a plasma display, and an Organic LED (OLED) display technology, and other display resources. The VR display 202 may refer to a display screen of a smart-glass device, a see-through display, a projection-based display, an electrochromic display, a transparent display, and the like.

The network interface 204 may comprise suitable logic, circuitry, and interfaces that may be configured to communicate with other systems and devices, via the communication network 108. The network interface 204 may be implemented by use of known technologies to support wired or wireless communication of the VR device 102 with the communication network 108. Components of the network interface 204 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 206 may comprise suitable logic, circuitry, and interfaces that may be configured to operate as an I/O channel/interface between the user 110 and the different operational components of the VR device 102. The I/O interface 206 may facilitate an I/O device (for example, the I/O console 104) to receive an input from the user 110 and present an output based on the provided input from the user 110. The I/O interface 206 may include various input and output ports to connect various I/O devices that may communicate with different operational components of the VR device 102. Examples of the input devices may include, but is not limited to, a touch screen, a keyboard, a mouse, a joystick, a microphone, and an image-capture device. Examples of the output devices may include, but is not limited to, a display (for example, the VR display 202), a speaker, and a haptic or other sensory output devices.

The plurality of sensors 208 may comprise suitable logic, circuitry, and interfaces that may be configured to collect and store information associated with the user 110 and a plurality of ambient parameters that may affect an immersive experience of the user 110. The plurality of sensors 208 may be implemented as embedded/wearable sensors with the VR device 102. In other embodiments, the plurality of sensors 208 may be implemented as part of a distributed sensory environment, where a portion of the sensors implemented as embedded/wearable sensors with the VR device 102 and a remnant portion of the sensors are implemented in the ambient environment of the user 110. Examples of the plurality of sensors 208 may include, but are not limited to, image sensors, microphones, gyroscopes, accelerometers, proximity sensors, magnetometers, touch sensors, luminance sensors, and other micro-electromechanical systems (MEMS) sensors or nano-electromechanical systems (NENS) sensors. For example, an HMD VR device may implement a combination of different MEMS-gyroscope sensors to detect six degrees of freedom with respect to different possible head movements along axes (such as yaw axis, roll axis, and pitch axis) associated with the HMD VR device.

The memory 210 may comprise suitable logic, circuitry, and interfaces that may be configured to store a set of instructions executable by the processor 212, the media decoder 214, the media renderer 216, and the playback controller 218. The memory 210 may be configured to store encoded 360° VR video and decoded 360° VR video. The memory 210 may be further configured to store the image metadata and user preference data for different layers of each video fragment of the 360° VR video. Examples of implementation of the memory 210 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a Central Processing Unit (CPU) cache, and/or a Secure Digital (SD) card.

The processor 212 may comprise suitable logic, circuitry, and interfaces that may be configured to execute a set of instructions stored in the memory 210. The processor 212 may be implemented based on a number of processor technologies known in the art. Examples of the processor 212 may include, but are not limited to, a Graphical Processing Unit (GPU), a CPU, an x86-based processor, an x64-based processor, a Reduced Instruction Set Computing (RISC) processor, an Application-Specific Integrated Circuit (ASIC) processor, a Complex Instruction Set Computing (CISC) processor.

The media decoder 214 may comprise suitable logic, circuitry, and interfaces that may be configured to generate a decoded 360° VR video by decompression of the plurality of layers in encoded video fragments of the encoded 360° VR video. In some embodiments, the media decoder 214 may be implemented as a specialized hardware decoder interfaced with the other computational circuitries of the VR device 102. In such implementation, the media decoder 214 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In other embodiments, the media decoder 214 may be further interfaced with a graphical processing unit (GPU) to parallelize operations of the media decoder 214. Additionally, the media decoder 214 may be implemented as a combination of programmable instructions stored in the memory 210 and logical units (or programmable logic units) on a hardware circuitry in the VR device 102.

The media renderer 216 may comprise suitable logic, circuitry, and interfaces that may be configured to render the plurality of flat layers in the decoded 360° VR video as a plurality concentric spherical layers such that the plurality concentric spherical layers are projected at a plurality of depth values at the VR display 202 of the VR device 102. Such plurality of depth values may facilitate the user 110 to visualize different concentric layers at different depth of fields. In some embodiments, the media renderer 216 may be implemented as a hardware media render circuitry at the VR device 102 that utilizes computational resources of the memory 210 and the processor 212. In other embodiments, the media renderer 216 may be further interfaced with a graphical processing unit (GPU) to parallelize operations of the media renderer 216. Additionally, the media renderer 216 may be implemented as a combination of programmable instructions stored in the memory 210 and logical units (or programmable logic units) on a hardware circuitry in the VR device 102.

The playback controller 218 may comprise suitable logic, circuitry and interfaces that may be configured to control the playback of the rendered 360° VR video at the VR display 202 of the VR device 102 based on a plurality of user inputs provided by the user 110. The controlled playback of the rendered 360° VR video may be associated with modifications of at least one of layer content, a depth of field of different layers, a depth of audio perception, a layer transparency, and the like. In some embodiments, the playback controller 218 may be implemented as a hardware media render circuitry at the VR device 102 that utilizes computational resources of the memory 210 and the processor 212. In other embodiments, the playback controller 218 may be further interfaced with a graphical processing unit (GPU) to parallelize operations of the playback controller 218. Additionally, the playback controller 218 may be implemented as a combination of programmable instructions stored in the memory 210 and logical units (or programmable logic units) on a hardware circuitry in the VR device 102. In some embodiments, the playback controller 218 may be integrated with the media renderer 216 as a single operational circuitry in the VR device 102, without a deviation from scope of the disclosure.

In operation, different components of the VR playback circuitry 200 at the VR device 102 may receive a playback request from the I/O interface 206. The playback request may be initiated by the user 110 (or a group of users) for playback of an encoded 360° VR video at the VR display 202. In one implementation, the playback request may be received at the network interface 204, via the communication network 108. In another implementation, instead of the network interface 204, the playback request may be received directly at the I/O interface 206. In response to the playback request, the processor 212 may be configured to identify the VR media content (in the form of an encoded 360° VR video) that the user 110 intends to watch or engage with, at the VR device 102.

The memory 210 may be configured to retrieve the encoded 360° VR video that matches a user preference of the playback request. The encoded 360° VR video may include a sequence of video fragments. Each video fragment of the sequence of video fragments may include a plurality of flat layers. Each flat layer of the plurality of flat layers may include at least one equirectangular image frame that is associated with an image metadata. Each video fragment of the sequence of video fragments may be further stored in a dedicated allocation in the memory 210 of the VR device 102 in accordance with a specific data structure. The specific data structure (or format) may indicate a way different VR content and non-VR content in each fragment may be accessed from the memory 210 at the VR device 102 (as illustrated in FIG. 3A). The media decoder 214 may be configured to decompress the plurality of flat layers and the image metadata for each flat layer of the encoded video fragment of the encoded 360° VR video. The media decoder 214 may generate a decoded 360° VR video after the decompression of different layers of the encoded 360° VR video. The decoded 360° VR video may be further processed for playback at the VR device 102. The detailed operation for the playback of the decoded 360° VR video has been further described in FIG. 2B, in detail.

Figure 2B:
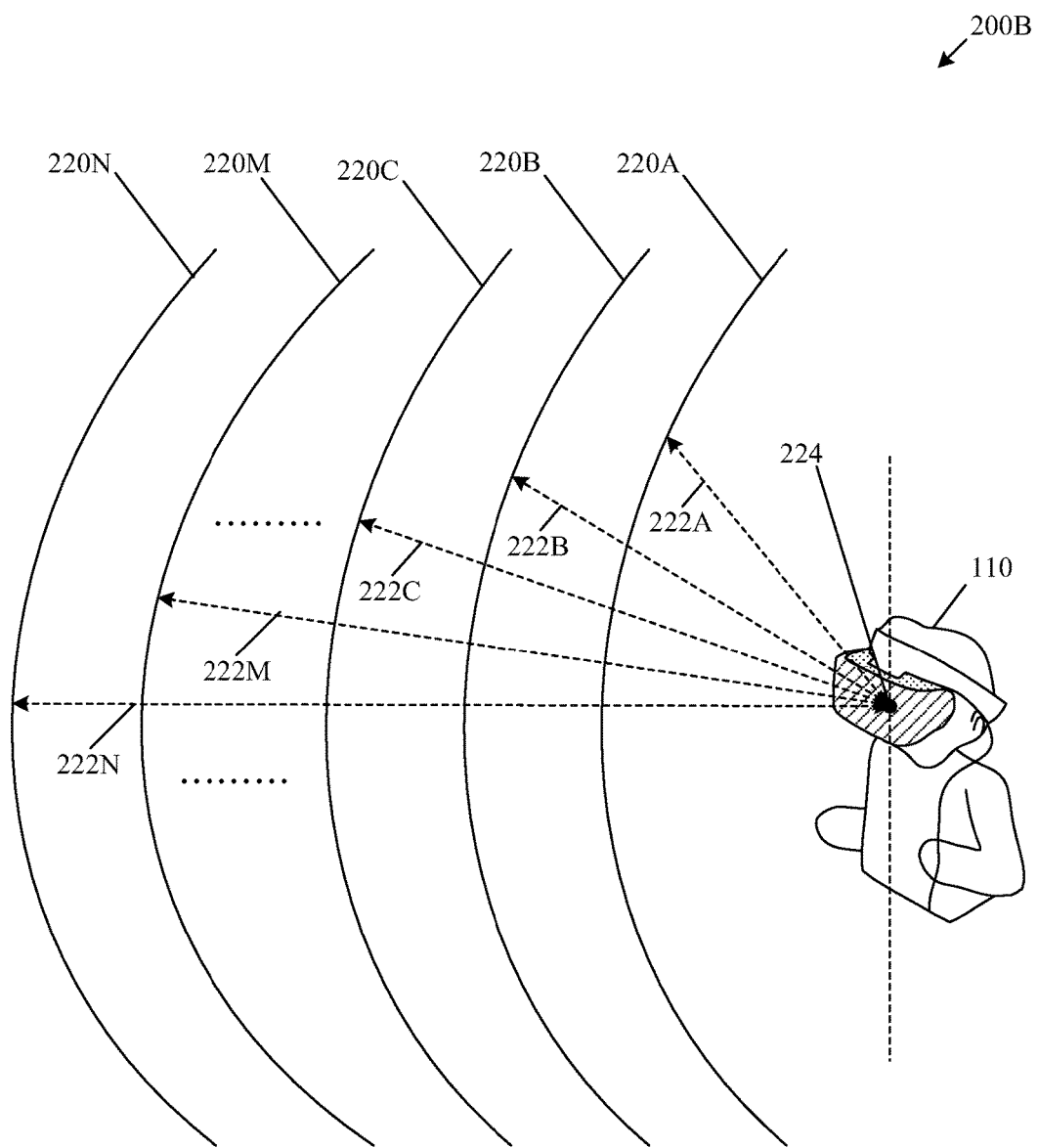
FIG. 2B is an exemplary scenario that illustrates different rendered layers of 360° VR video at an HMD device worn by a user, in accordance with an embodiment of the disclosure.

FIG. 2B is an exemplary scenario that illustrates different rendered layers of 360° VR video at an HMD device worn by a user, in accordance with an embodiment of the disclosure. FIG. 2B is explained in conjunction with elements from FIGS. 1 and 2A. With reference to FIG. 2B, there is shown a scenario 200B where a user (for example, the user 110) who wears an HMD device engages with the rendered 360° VR video.

The media renderer 216 may be configured to render the plurality of flat layers in each video fragment of the encoded 360° VR video as a plurality of concentric spherical layers 220A ... 220N projected at the VR display 202. Each flat layer may represent an equirectangular projection of a 2D image frame on a rectilinear plane (or a gnomonic projection) and each concentric spherical layer (for example, a spherical layer 220A) may represent a spherical projection of the same 2D image on a spherical plane. Thus, the media renderer 216 may be configured to transform a projection of a 2D image frame from an equirectangular plane to a spherical plane at the VR display 202 of the VR device 102. The user 110 at the center of the spherical plane may see a rectilinear projection of the same 2D image within a given field-of-view of the user 110. The plurality of concentric spherical layers 220A ... 220N may be projected at a plurality of depth values 222A ... 222N with respect to a user viewpoint 224. A depth value for each flat layer of each video fragment may correspond to a radius of a concentric spherical layer measured with respect to the user viewpoint 224. Alternatively stated, the plurality of concentric spherical layers 220A ... 220N may be rendered such that the user viewpoint 224 lies at the center of the plurality of concentric spherical layers 220A ... 220N. Thus, each concentric spherical layer may provide an immersive depth of field that increases with an increase in radius of such concentric spherical layer at the VR display 202. Each of the plurality of concentric spherical layers 220A to 220N may be associated with a depth of field that may be represented by a difference between depth values of two consecutive concentric spherical layers. The depth of field may also refer to a resolution of content displayed in a concentric spherical layer in a longitudinal plane. The depth of field may be represented by a distance from a nearest object plane in focus to a farthest object plane that may be simultaneously in focus in different concentric spherical layers, whereas the depth value may represent a radius of each concentric spherical layer with respect to user's viewpoint. In some embodiments, the depth of field for each concentric spherical layer may be controlled, by the VR device 102, based on a change in an f-number or a focal length of an imaging device that captures an image rendered as a spherical concentric layer. The f-number may be represented by N, which is also represented as a ratio "f/D", where "f" is the focal length of the lens used by an imaging device and "D" is a diameter of lens aperture exposed to light. The depth of field ($D_F$) may be represented by an equation (1), as follows:

$$D_F = 2 \times N \times C \times d^2 / f^2 \quad (1)$$

Where, C represents a circle of confusion, and d represents a distance between the lens and a reference object (i.e. the user 110).

The circle of confusion (c) may represent a blur spot diameter at a particular point in an image (rendered as a concentric spherical layer) which further represents an acceptable depth of field or sharpness of objects depicted in the image at the particular point. The plurality of concentric spherical layers 220A to 220N may be rendered based on the image metadata for each flat layer of the plurality of flat layers. Alternatively stated, the media renderer 216 may utilize a set of attributes specified in the image metadata for each flat layer of the plurality of flat layers in the sequence of video fragments. The set of attributes specified in the image metadata may include layer information associated with a layer type, a depth value, a three dimensional (3D) audio position value, an alpha value, and media player-specific information.

The decoded 360° VR video may be rendered as the plurality of concentric spherical layers 220A to 220N to assign a different depths of field to each concentric layer at the VR device 102, as compared to conventionally rendered flat 360° VR videos that are rendered on a single sphere of a fixed radius and lack a perception of a depth of field for different layers in a scene. This is advantageous as assigning a different depth of field to each concentric layer at the VR device 102 provides an enhanced depth sense for different layers in the scene.

In some embodiments, the plurality of concentric spherical layers 220A to 220N may include a background spherical layer 220N and a plurality of spherical item layers 220A . . . 220M. The media renderer 216 may be configured to render the background spherical layer 220N as an outermost concentric spherical layer of the plurality of concentric spherical layers 220A to 220N. The background spherical layer 220N may be associated with a depth value that is a maximum of the plurality of depth values 222A . . . 222N specified for the plurality of flat layers in each video fragment of the decoded 360° VR video. Accordingly, the media renderer 216 may be further configured to render each of the plurality of spherical item layers as an inner concentric spherical layer of the plurality of concentric spherical layers 220A to 220N. Alternatively stated, in some implementations, the background spherical layer 220N may be focused at a maximum depth value (i.e. a maximum radius of concentric spherical layer) at the VR display 202 of the VR device 102 and the plurality of spherical item layers 220A . . . 220M may be rendered at a low depth values (i.e., a lower radius of concentric spherical layers) of field with respect to the depth of field of the background spherical layer 220N. In some implementations, the background spherical layer 220N may include an image frame associated with the requested VR media content and the plurality of spherical item layers 220A . . . 220M may include at least one of a graphic image, textual content, an interactive button, a user interface, a 3D depth texture, a computer-generated imagery (CGI), or an animation sequence. Alternatively stated, the plurality of spherical item layers may be utilized as additional layers (for example, subtitles, animation effects, and overlay graphics (such as ads, player information, report card, and the like)) that supplement the VR media content of the background layer.

For example, a rendered 360° VR video of a gameplay for a virtual football match may include a sequence of video fragments ($F_1 \ldots F_N$). Of the sequence of video fragments ($F_1 \ldots F_N$), a first video fragment ($F_1$) may include a plurality of concentric spherical layer ($L_1 \ldots L_N$) rendered at the VR display 202 of the VR device 102. The first concentric spherical layer ($L_1$) may be an innermost spherical item layer (e.g., a graphical button that is rendered nearest to a user's viewpoint) and the other concentric spherical layers ($L_2 \ldots L_{N-1}$) may be the plurality of spherical item layers that may be rendered at depth values that is more than a depth value for a background spherical layer ($L_N$). In case of a five layered VR football match, the first spherical layer ($L_1$) may project a view of a playground within a stadium filled with virtual audiences at a minimum depth value (i.e., minimum radius). A second spherical layer ($L_2$) may project an overlay graphic of players in different teams that may be a part of the virtual football match, at a depth value that is greater than minimum depth value for the $L_1$. A third spherical layer ($L_3$) may project a rain animation graphic around the virtual audience at a depth value that is greater than that of $L_1$ and $L_2$. A fourth spherical layer ($L_4$) may project English subtitles for the virtual football match, at a depth value that is greater than that of $L_1$, $L_2$, and $L_3$. A fifth spherical layer ($L_5$) may project a play button for the virtual football match at a depth value that is greater than that of $L_1$, $L_2$, $L_3$, and $L_4$.

In accordance with an embodiment, the media renderer 216 may be further configured to render the plurality of concentric spherical layers 220A to 220N in each video fragment of the 360° VR video as a plurality of voxels. The plurality of voxels may be rendered in a volume that may be aligned with a view plane of the user. A depth of field may be further added to different layers of voxels by application of a technique based on volumetric texture rendering. The detailed operations associated with the volumetric texture rendering may be known to one skilled in the art and therefore, such details have been omitted from the disclosure for the sake of brevity.

In some embodiments, the media renderer 216 may be further configured to render an audio item for a concentric spherical layer of each video fragment of a decoded 360° VR video. The audio item may be rendered in accordance with a 3D audio position value for the audio item of the concentric spherical layer. The 3D audio position value may specify a direction of audio perception and a depth of audio perception for the audio item of different concentric spherical layers of the plurality of concentric spherical layers 220A to 220N. The direction of audio perception may be further set in accordance with a gaze of the user 110 at a specific point on the plurality of concentric spherical layers 220A to 220N. For example, if the user 110 may look at a virtual audience that sits to the left of a virtual stadium, the direction of audio perception may be set from the audience sitting to the left of the stadium and the depth of audio perception may be set as per a depth value of the layer that includes the audience (as illustrated in FIG. 4B).

At a time instant, the user 110 may intend to modify different attributes associated with different layers of content displayed at the VR display 202 of the VR device 102. Thus, the processor 212 may receive a plurality of user inputs that may depict a preference of the user 110 for a type of immersive VR experience that may be of interest to the user 110. The plurality of user inputs may be associated with a modification of a set of attributes in the image metadata associated with user-selected concentric spherical layers of the plurality of concentric spherical layers 220A to 220N in each video fragment of the rendered 360° VR video.

The plurality of user inputs may include, but are not limited to, a touch input, a haptic input, a gesture input, a voice input, a head-rotation input, or an eye movement input, and a pupil dilation input. Such user inputs may be collected based on different sensors that measure different features of the user 110. Thus, in some embodiments, the processor 212 may be configured to collect user information from the plurality of sensors 208. The user information may include data associated with a motion of the body and/or different body parts, movement of eyes of the user 110, pupil contraction and dilation, gesture, touch, posture, facial expressions (for example, fear, sadness, happiness, apathy, anger, etc.), voice patterns, sentiments, and tone, and the like. For example, a MEMS-gyroscope in an HMD-based VR device may determine a change in the field-of-view of the 360° VR video based on movement of the head by 30° to the left along a yaw axis. Additionally, the processor 212 may be configured to collect data associated ambient parameters from the plurality of sensors 208. The data associated with the ambient parameters may include luminance distribution in the environment that is ambient to the user 110, an estimated occupancy in the ambient environment, a noise effect in the ambient environment, a type of built environment in use by the VR device 102, an effective 3D map of the space available in the ambient environment, and the like.

The processor 212 may be further configured to generate a modified image metadata for each of the user-selected concentric spherical layers in each video fragment of the rendered 360° VR video. The modified image metadata may be generated based on modification of the set of attributes of the image metadata associated with the user-selected concentric spherical layers in each video fragment of the rendered 360° VR video. For example, the modified image metadata may include modifications in a layer type, layer content, a layer transparency, a depth value for the layer, an audio depth value for the layer, and the like. In some embodiments, the user 110 may touch and select different rendered concentric spherical layers in the virtual environment and modify the set of attributes in the image metadata for different concentric spherical layers. The modification of the set of attributes of the image metadata for the user-selected concentric spherical layers of different video fragments may correspond to a modification of the user-selected concentric spherical layers of different video fragments during the playback of the decoded 360° VR video at the VR display 202 of the VR device 102.

The modified image metadata may be further utilized to personalize the immersive VR experience associated with the modifications in the rendered 360° VR video for the user 110. Thus, the playback controller 218 may be configured to control playback of each video fragment rendered as the plurality of concentric spherical layers 220A to 220N. The controlled playback of each video fragment may correspond to at least one of a switch in a position, a modification of content, a modification of an audio depth perception, a direction of audio perception, or a level of transparency of different concentric spherical layers of each video fragment in the rendered 360° VR video. The playback may be controlled in accordance with the modified image metadata for the user-selected concentric spherical layers of each video fragment of the rendered 360° VR video. The playback of each video fragment may be further controlled based on user selection of the set of attributes in the image metadata of the user-selected concentric spherical layers of different video fragments. Thus, advantageously, the user 110 may interact with different concentric spherical layers of 360° VR video and personalize the playback of different portions of the 360° VR video during the real time or near real time playback of the 360° VR video. The interactivity, the engagement of the user 110 with different concentric spherical layers of the 360° VR video, and the controlled playback of the 360° VR video may be seamless with the real time or the near real time modifications in the image metadata for different concentric spherical layers of the 360° VR video.

In accordance with an embodiment, the playback controller 218 may be configured to switch a position of different concentric spherical layers of each video fragment of the rendered 360° VR video in accordance with a modification of a depth value for the different concentric spherical layers in the associated image metadata. The switch may be done based on a receipt of a user input for the modification of the depth value for the different concentric spherical layers. As an example, the user 110 may modify a depth value of the background spherical layer 220N from "R1" to "R2" based on a touch or a swipe of the background spherical layer 220N. In such implementations, the memory 210 may store multiple equirectangular image frames for a single image frame captured with different focal length values (represented by different f-numbers, i.e. a ratio (f/D) of a focal length (f) to a lens aperture diameter (D) for an imaging device). Therefore, the playback controller 218 may render the background spherical layer 220N with an equirectangular image frame that is associated with a depth value 222N selected by the user 110. As an example, a background image (i.e., the outermost spherical layer with respect to a user's viewpoint) may be rendered at different depth values (e.g., as may be represented by an f-number "f/11") from a previous depth value (e.g., as may be represented by an f-number "f/8"). The modification from "f/8" to "f/11" may further increase a depth of field in content displayed in the background image.

The playback controller 218 may be further configured to modify content of different concentric spherical layers of each video fragment of the rendered 360° VR video. Such modification may be done in accordance with a modification of a layer type in the image metadata for the different concentric spherical layers. Examples of the layer type may include, but are not limited to, graphic images, textual content, interactive buttons, user interfaces, 3D depth textures, CGIs, or animation sequences. The modification may be further done based on the receipt of a user input for the modification of the layer type for the different concentric spherical layers. For example, the user 110 may provide a first input to modify the layer type of the inner most spherical layer (lowest depth of field from the user viewpoint 224) from a button type to a subtitle type. Accordingly, the layer type of adjacent spherical layer may be modified from the animation type to button type. In general, the user 110 may decide which type of layer will have what type of depth of field with respect to the user viewpoint 224.

In accordance with an embodiment, the playback controller may be configured to modify a depth of audio perception and a direction of audio perception of different audio items for different concentric spherical layers of each video fragment. The modification of the depth of audio perception and the direction of audio perception of different audio items may be done in accordance with a modification of a 3D audio position value for the different concentric spherical layers of each video fragment of the rendered 360° VR video. The modification of the depth of audio perception and the direction of audio perception of different audio items may be done further based on the receipt of a user input for the modification of the 3D audio position value for the different concentric spherical layers.

As an example, a position of the background spherical layer 220N may be switched by the user by a modification of a depth value from "$R_N$" to "$R_{N-3}$" (i.e., a decrease in radius of concentric spherical layer). Thus, the audio item (for example, audience cheer) associated with background layer may further require a modification in the depth of audio perception, which may be proportional to the modification of the depth value associated with the change in position of the background spherical layer 220N.

As another example, a user that wears an HMD VR device may move their head along either a yaw axis, a roll axis, or a pitch axis while getting engaged in a virtual football match. Such movements may cause a change in a virtual scene in the field of view of the user 110 and thus, the position of audience in a virtual stadium may change in the field of view. The playback controller 218 may be configured to modify the direction of audio depth perception with the playback of the audio item for the audience cheer. The modification in the direction of audio perception and the depth of audio perception may be done in accordance with collected user information associated with at least one of position of ears, noise in ambient environment, frequency sensitivity/audio amplitude sensitivity of the user, and the like. In some implementations, the depth of audio perception and the direction of audio perception of different audio items for different concentric spherical layers of each video fragment may be modified further based on a change in a point of gaze of the user 110 on the different concentric spherical layers of each video fragment at the VR display 202. Such change in the point of gaze may be determined in accordance with a movement of user's eyes. In some cases, an eye movement sensor (or an image sensor) may be utilized to determine a change in a gaze of the user 110 at from one point to another point on different concentric spherical layers displayed at the VR device 102.

In accordance with an embodiment, the playback controller 218 may be further configured to modify a level of transparency of different concentric spherical layers of each video fragment of the rendered 360° VR video. Such modifications in the level of transparency may be done in accordance with a modification of an alpha value of the different concentric spherical layers. The modification may be done further based on the receipt of a user input for the modification of the alpha value for the different concentric spherical layers. For example, an alpha value of "0.1" (or 10%) may be selected by a user for an inner most concentric spherical item layer for subtitles and an alpha value of "0.8" for a concentric spherical item layer of overlay graphic that is placed adjacent to the background spherical layer. Such modifications in the alpha value may be further utilized to hide or show a specific layer that is concentric to other layers that exhibit a depth of field that is greater than that of the specific layer. As per a default condition, the alpha value for a concentric spherical layer that has a lower depth value may be always kept below an alpha value for a concentric spherical layer that has a higher depth value. The default condition may be set as unmodifiable for a user to prevent a misconfiguration in visualization of the plurality of concentric spherical layers. Such misconfiguration in visualization may be caused by a decrease in a transparency of a concentric spherical layer that is rendered closer to a user's viewpoint with respect to a transparency level of a concentric spherical layer that is render away from the user's viewpoint at higher depth values.

In accordance with an embodiment, the rendered 360° VR video may be further personalized for the user 110, by the processor 212, based on a selective removal of different concentric layers from the rendered 360° VR video, a combination or a merger of two different concentric layers to a single concentric layer, a division of a single concentric layer to multiple concentric layers that may be rendered at different depth values, a modification of text, hyperlinks, other associated content or an appearance of a user interface, and the like.

The plurality of flat layers may be rendered as the plurality of concentric spherical layers 220A to 220N, i.e. from an equirectangular projection to a spherical projection. However, the spherical projection of the plurality of concentric spherical layers 220A to 220N may be viewed by the user as a rectilinear (or Gnomonic) projection of the same concentric spherical layers, without deviation from scope of the disclosure. Alternatively stated, the user 110 may view the concentric spherical images similar to how the user 110 usually perceives a scene, within a restricted field of view, for example, approximately "114°".

Figure 2C:
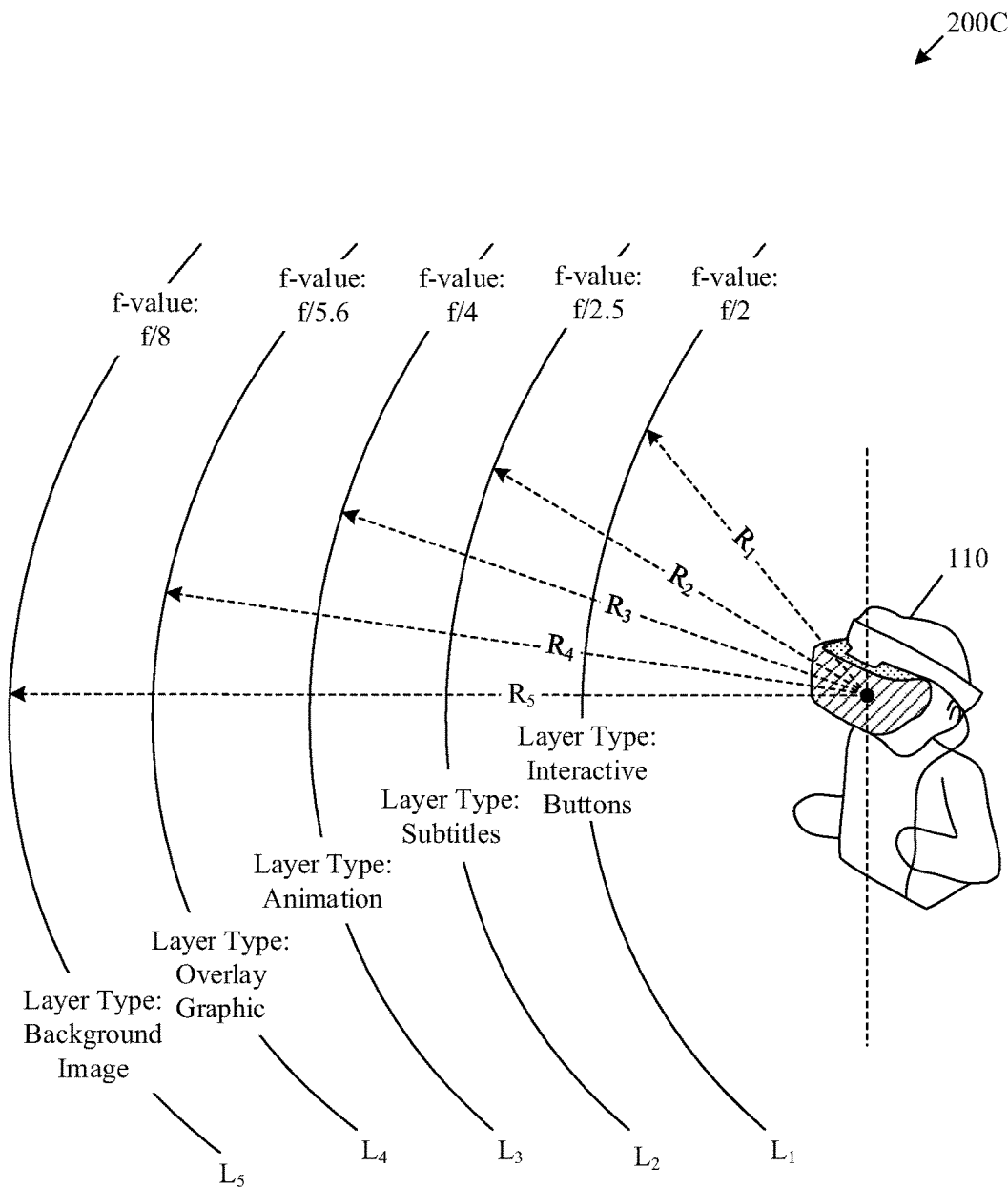
FIG. 2C is an exemplary scenario that illustrates different rendered layers of 360° VR video at an HMD device, in accordance with another embodiment of the disclosure.

FIG. 2C is an exemplary scenario that illustrates different rendered layers of 360° VR video at an HMD device, in accordance with another embodiment of the disclosure. FIG. 2C is explained in conjunction with elements from FIGS. 1, 2A, and 2B. With reference to FIG. 2C, there is shown an exemplary scenario 200C, where a set of concentric spherical layers (represented by $L_1$, $L_2$, $L_3$, $L_4$, and $L_5$) are rendered at different depth values (each depth value represents a radius of a concentric spherical layer) with respect to a user's viewpoint.

The set of concentric spherical layers (represented by $L_1$, $L_2$, $L_3$, $L_4$, and $L_5$) may include a first concentric spherical layer ($L_1$), a second concentric spherical layer ($L_2$), a third concentric spherical layer ($L_3$), a fourth concentric spherical layer ($L_4$), and a fifth concentric spherical layer ($L_5$). The set of concentric spherical layers (represented by $L_1$, $L_2$, $L_3$, $L_4$, and $L_5$) may be associated with a set of radius values (represented by $R_1$, $R_2$, $R_3$, $R_4$, and $R_5$) that may increase from $R_1$ to $R_5$ linearly. The depth of field may be different from a layer depth for a concentric spherical layer. The depth of field may refer to a resolution of content displayed in a concentric spherical layer in a longitudinal plane. The depth of field may be represented by a distance from a nearest object plane in focus to a farthest object plane that may be concurrently in focus in different concentric spherical layers, whereas the layer depth may represent a radius of each concentric spherical layer with respect to user's viewpoint. In some embodiments, the depth of field for each concentric spherical layer may be controlled, by the VR device 102, based on a change in an f-number or a focal length of an imaging device that captures an image rendered as a spherical concentric layer. The f-number is represented by N, which is also represented as a ratio "f/D", where "f" is the focal length of the lens used by an imaging device, and "D" is a diameter of lens aperture exposed to light. The depth of field ($D_F$) may be represented by the equation (1).

The depth value for the first concentric spherical layer ($L_1$) may be less than a depth value for the second spherical layer ($L_2$) and so on. The content rendered at each spherical layer may be based on the image metadata specified for a flat layer in the decoded 360° video in the memory 210 of the VR device 102. The image metadata for the first spherical layer ($L_1$) may specify a layer type as interactive buttons, with an f-number of 112", where f represents the focal length and "2" represents a diameter of lens aperture, a depth value for $L_1$ represented by a radius $R_1$, an alpha value of "0.1", and the like. The image metadata for the second spherical layer ($L_2$) may specify a layer type as subtitles, an f-number of "f/2.5", a depth value for $L_2$ represented by a radius $R_2$, an alpha value of "0.2", and the like. The image metadata for the third spherical layer ("$L_3$") may specify a layer type as animation, an f-number of 114", a depth value for $L_3$ represented by a radius $R_3$, an alpha value of "0.3", and the like. The image metadata for the fourth spherical layer ($L_1$) may specify a layer type as an overlay graphic, an f-number of "f/5.6", an alpha value of "0.4", and the like. The image metadata for the fifth spherical layer ($L_5$) may specify a layer type as a background image, an f-number of 118", an alpha value of "0.5", and the like. The media renderer 216 may be configured to render a set of flat layers as the set of concentric spherical layers (represented by $L_1$, $L_2$, $L_3$, $L_4$, and $L_5$), at the VR display 202, based on the attributes specified for each of the set of concentric spherical layers (represented by $L_1$, $L_2$, $L_3$, $L_4$, and $L_5$).

FIG. 3A is an exemplary scenario that illustrates a video format of the 360° VR video that is rendered at the VR device, in accordance with an embodiment of the disclosure. FIG. 3A is described in conjunction with elements from FIG. 1, FIG. 2A and FIG. 2B. With reference to FIG. 3A, there is shown a first scenario 300A that is associated with rendering of an encoded 360° VR video 302 at an HMD device 304 worn by a user 306.

The HMD device 304 stores the encoded 360° VR video 302 in the memory 210. The encoded 360° VR video 302 may include a sequence of video fragments 308A . . . 308N. Each video fragment in the sequence of video fragments 308A . . . 308N may further include a plurality of flat layers, for example, a plurality of flat layers 310A . . . 310N in the video fragment 308A. Alternatively stated, the encoded 360° VR video 302 may cluster a background image frame and associated layers that may be rendered concentric to the background image frame into a single video fragment. Different background frames may be clustered into different video fragments that may be stored in a sequence in the memory 210.

A flat layer 310 in the plurality of flat layers 310A . . . 310N may be an equirectangular image frame 312A that is associated with an image metadata 312B. The image metadata 312B may describe a set of attributes 314A . . . 314N associated with content, and different properties of the equirectangular image frame 312A. For example, the set of attributes 314A . . . 314N may include a first attribute (M1) 314A, a second attribute (M2) 314B, a third attribute (M3) 314C, a fourth attribute (M4) 314D, and a fifth attribute (M5) 314E. Such attributes M1, M2, M3, M4, and M5 may be associated with at least one of a layer type (textual, background, user interface, button, animation, etc.), a depth value, an alpha value, a depth and direction of audio perception, and the like.

The encoded 360° VR video 302 may be decoded and rendered at the HMD device 304. At a specific timeframe, a rendered 360° VR video 316 may include a plurality of concentric spherical layers (for example, a plurality of concentric spherical layers 318A . . . 314E) rendered from the plurality of flat layers 310A . . . 310N in the video fragment 308A. Each layer of the plurality of concentric spherical layers 318A . . . 318E may provide a different depth of field to the user 306 with respect to the user viewpoint for example, a center of the plurality of concentric spherical layers 318A . . . 318N of the rendered 360° VR video 316. The rendered 360° VR video 316 may further provide an immersive VR experience that may be further personalized by the user 306 based on different types of user inputs, for example, layer switching, depth adjustment, audio depth modification, transparency adjustments, layer hide/show, and the like.

FIG. 3B is an exemplary scenario that illustrates a view of different rendered layers of 360° VR video at an HMD device worn by a user, in accordance with an embodiment of the disclosure. FIG. 3B is explained in conjunction with elements from FIGS. 1, 2A, 2B, and 3A. With reference to FIG. 3B, there is shown a second exemplary scenario 300B that include a view of a plurality of concentric spherical layers 318A . . . 318E rendered at the HMD device 304 with respect to the user 306. The view of the plurality of concentric spherical layers 318A . . . 318E may include a first layer 318A, a second layer 318B, a third layer 318C, a fourth layer 318D, and a fifth layer 318E that are rendered at different depth of field at the HMD device 304 with respect to the user viewpoint.

The first layer 318A may be an item layer that shows interactive buttons (for example, a play button to start the VR football match). The second layer 318B may be another item layer that shows textual content (for example, subtitles for match commentary during the VR football match). The third layer 318C may be yet another item layer that shows an overlay graphic (for example, competing players in a VR football match) at a depth of field different from that of the first layer 318A and the second layer 318B. The fourth layer 318D may be an item layer that shows an animation effect (for example, rain effect over virtual audience in the VR football stadium) at a specific depth of field with respect to the user viewpoint. Finally, the fifth layer 318E may be a background layer that shows a background image frame (for example, a VR football stadium) of a user requested VR content.

The HMD device 304 may be configured to measure different movements of the body parts of the user 306 as triggers for different interactive options associated with controlled playback of the rendered 360° VR video 316. For example, head movements of the user 306 along a yaw axis 320A, a roll axis 320B, and a pitch axis 320C may be utilized to pan around and zoom in/out to different portions of the rendered 360° VR video 316 within a field-of-view of the user 306.

Figure 4A:
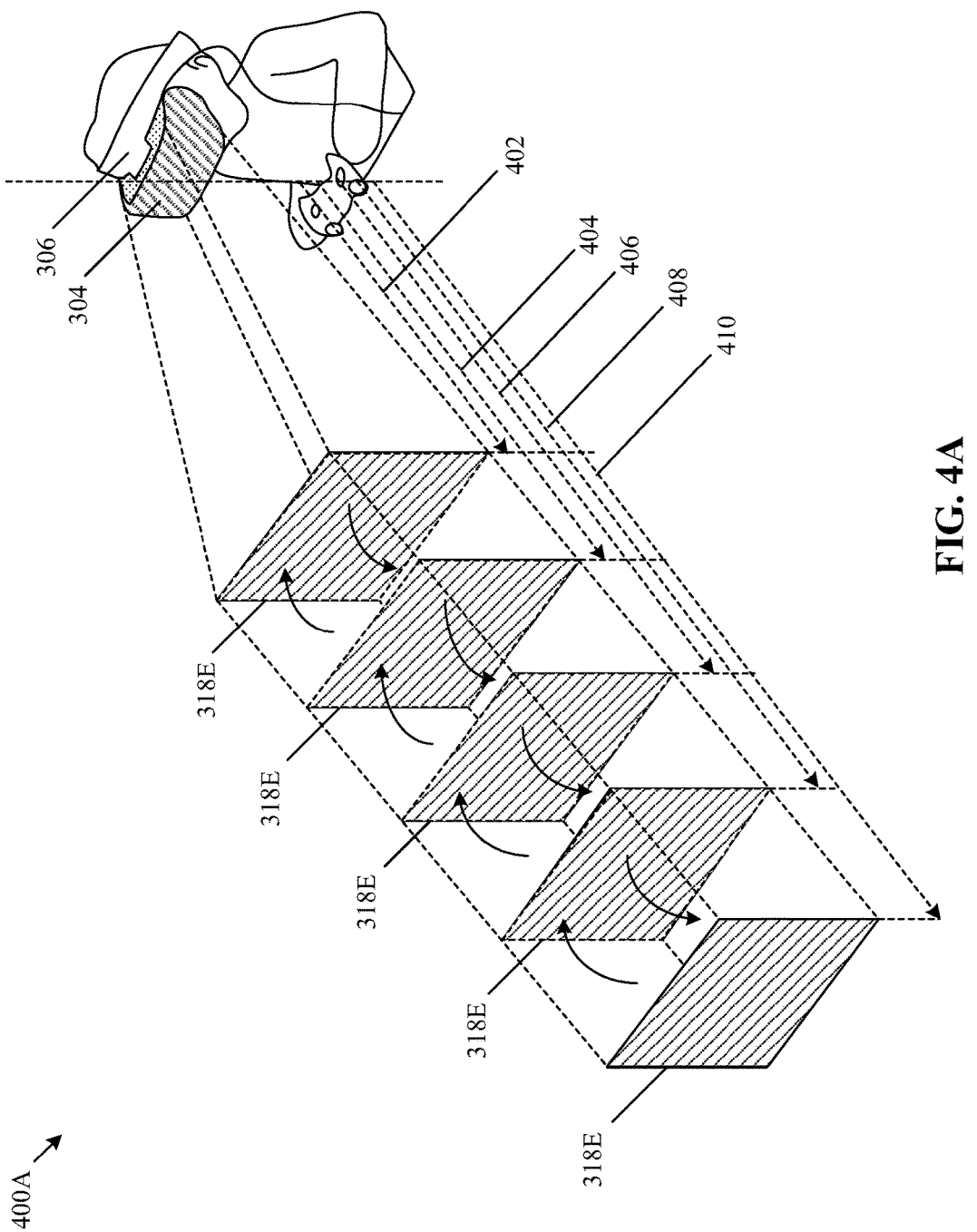
FIG. 4A is an exemplary scenario that illustrates a modification of a depth of field of a background layer in response to a user input, in accordance with an embodiment of the disclosure.
Figure 4B:
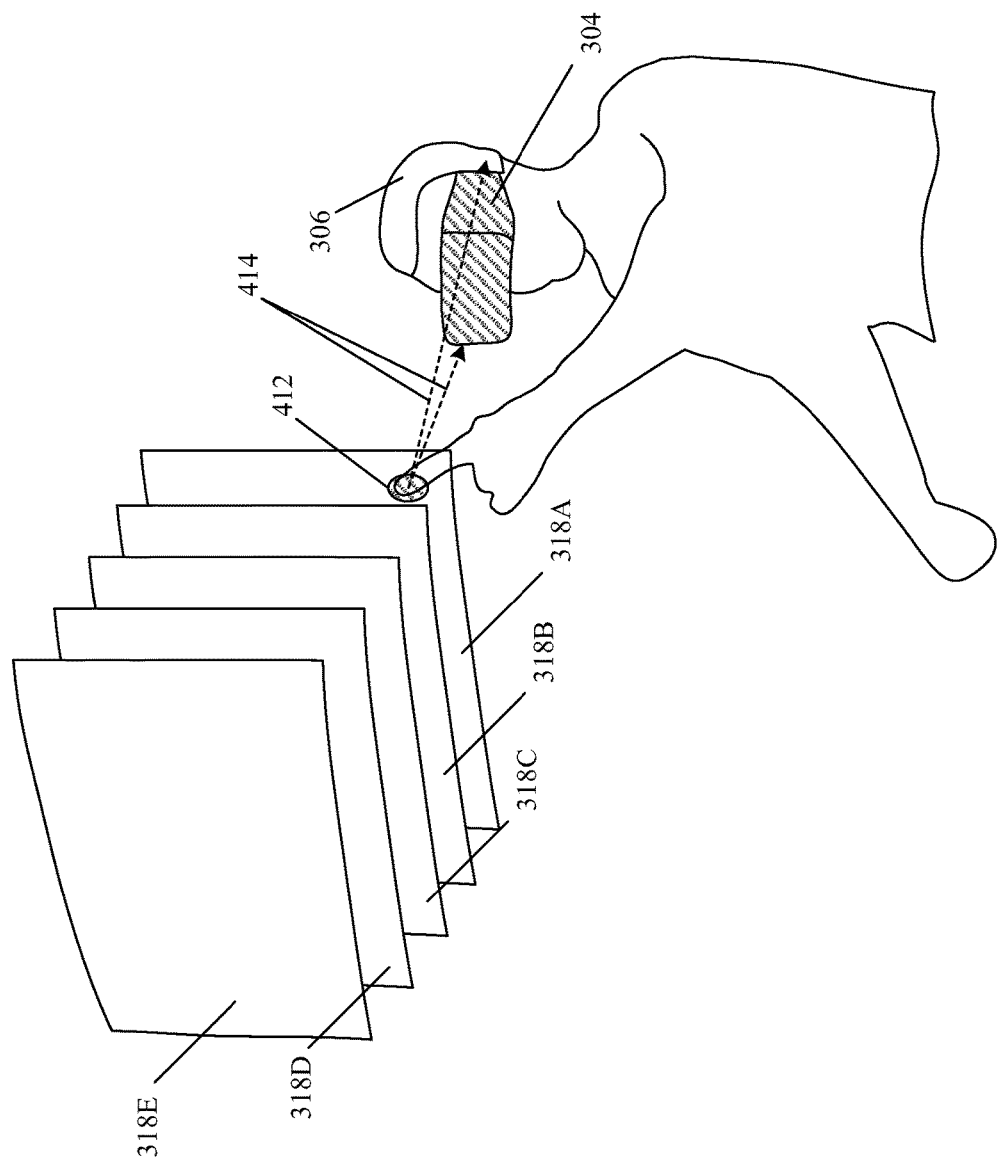
FIG. 4B is an exemplary scenario that illustrates a modification of a depth of audio perception and a direction of audio perception for different rendered layers in response to a user input, in accordance with an embodiment of the disclosure.

FIG. 4A is an exemplary scenario that illustrates a modification of a depth of field of a background layer in response to a user input, in accordance with an embodiment of the disclosure. FIG. 4A is explained in conjunction with elements from FIGS. 1, 2A, 2B, 3A, and 3B. With reference to FIG. 4A, there is shown a first scenario 400A associated with modification of a depth value of the fifth layer 318E (background image) in response to an input from the user 306.

The I/O interface 206 of the HMD device 304 may receive a user input to modify a depth value of the fifth layer 318E. The user input may be received (or detected) based on a body movement, an eye movement, a touch, or an external I/O console that may be controlled by the user 306. The fifth layer 318E may be rendered at a first depth value 402, a second depth value 404, a third depth value 406, a fourth depth value 408, and a fifth depth value 410, based on a user input to switch the fifth layer from a first position to a second position in the concentric layers.

The equirectangular image frame in the fifth layer 318E may be captured at different focal length values of an imaging device, for example, as represented by different f-numbers. For example, the fifth layer 318E at the first depth value 402, the second depth value 404, the third depth value 406, the fourth depth value 408, and the fifth depth value 410, may be associated with an f-number of "f/2", f/2.8", "f/4", "f/5.6", and "f/8". Here, "f" may be the focal length of the camera or the lens that captured the image frame of a scene via an image sensor and 2, 2.8, 4, 5.6, and 8 may represent f-numbers that also represents an f-stop.

FIG. 4B is an exemplary scenario that illustrates a modification of a depth of audio perception and a direction of audio perception for different rendered layers in response to a user input, in accordance with an embodiment of the disclosure. FIG. 4B is explained in conjunction with elements from FIGS. 1, 2A, 2B, 3A, 3B, and 4A. With reference to FIG. 4B, there is shown a second scenario 400B associated with modification of a direction and depth of audio perception of a layer in the plurality of concentric spherical layers 318A . . . 318E of the video fragment 308A, in response to an input from the user 306.

In some cases, an input may be provided by the user 306 to the HMD device 304. Such input may be a touch input or a console input for selection of a region-of-focus 412 on the one of the plurality of concentric spherical layers 318A . . . 318E rendered at the HMD device 304. The HMD device 304 may utilize the region-of-focus 412 to set a direction of audio perception and a depth of audio perception with respect to ears of the user. Alternatively stated, the HMD device 304 may determine direction vectors 414 that points from the region-of-focus 412 to the both the ears of the user 306 to provide an immersive and directional audio perception to the user 306. The HMD device 304 may adjust an audio depth value for an audio item specified for that layer such that the rendered audio is directed from the region-of-focus 412 to the ears of the user 306.

In other cases, the user 306 may gaze at a specific point on one of the layers rendered at the HMD device 304. The HMD device 304 may be configured to identify a look direction (shown by direction vectors 414) and the region-of-focus 412 based on point of gaze with respect to the view plane of the user 306. The HMD device 304 may further render an audio item for the layer such that the direction of audio perception and the depth of audio perception is perceived by the user 306 as directed from the region-of-focus 412.

Figure 5:
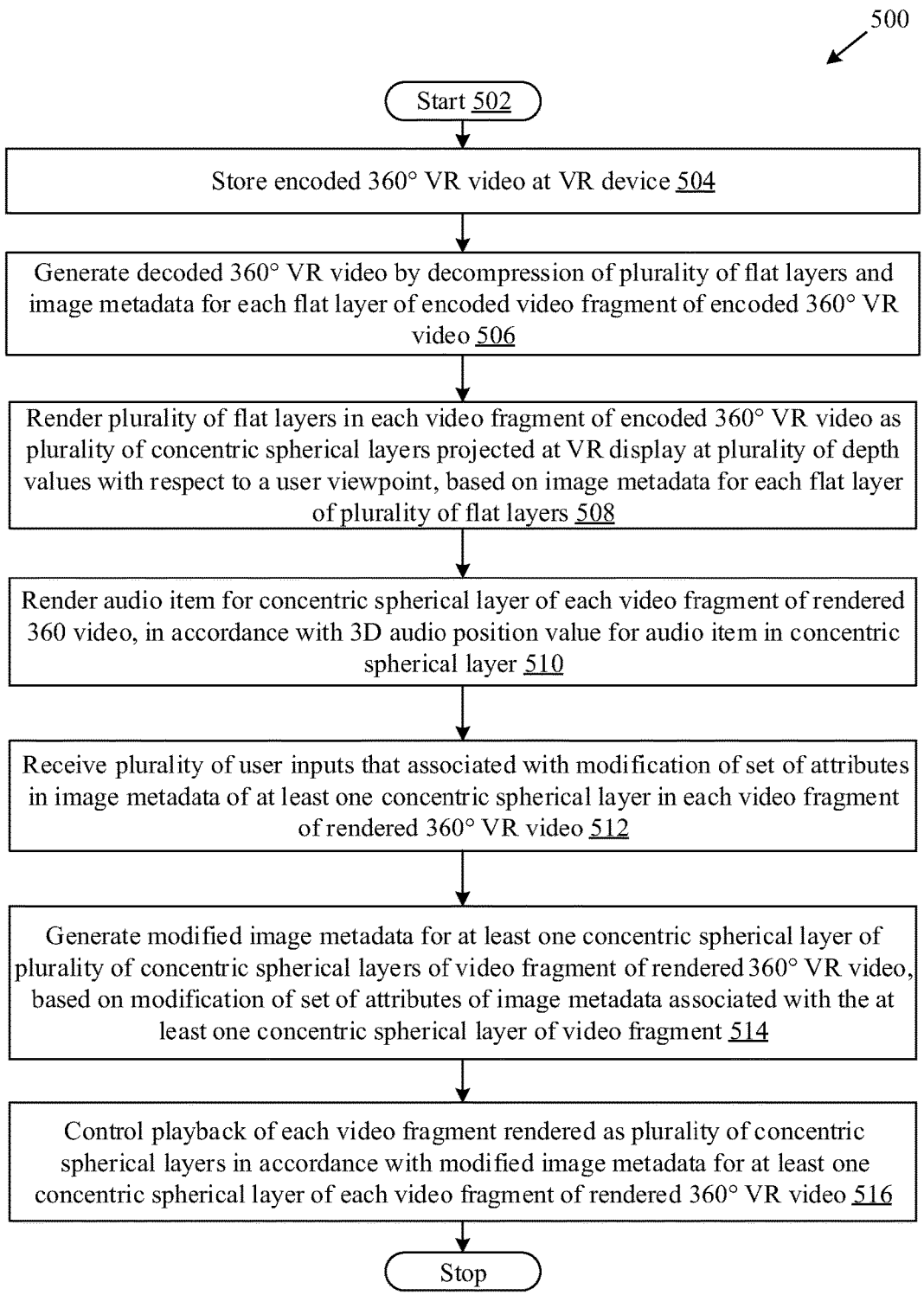
FIG. 5 is a flow chart that illustrates an exemplary method for user-interactive playback of immersive VR video, in accordance with an embodiment of the disclosure.

FIG. 5 is a flow chart that illustrates an exemplary method for user-interactive playback of immersive VR video, in accordance with an embodiment of the disclosure. FIG. 5 is explained in conjunction with elements from FIGS. 1, 2, 3A-3B, and 4A-4C. With reference to FIG. 5, there is shown a flowchart 500. The method starts at 502 and proceeds to step 504.

At 504, an encoded 360° VR video may be stored at the VR device 102. The memory 210 may be configured to store the encoded 360° VR video at the VR device 102. The encoded 360° VR video may include a sequence of video fragments. Each video fragment may include a plurality of flat layers. Each flat layer of the plurality of flat layers may be an equirectangular image frame that may be associated with an image metadata.

At 506, a decoded 360° VR video may be generated by decompression of the plurality of flat layers and the image metadata for each flat layer of the encoded video fragment of the encoded 360° VR video. The media decoder 214 may be configured to generate the decoded 360° VR video by decompression of the plurality of flat layers and the image metadata for each flat layer of the encoded video fragment of the encoded 360° VR video.

At 508, the plurality of flat layers in each video fragment of the encoded 360° VR video may be rendered as a plurality of concentric spherical layers projected at the VR display 202 at a plurality of depth values with respect to a user viewpoint, based on the image metadata for each flat layer of the plurality of flat layers. The media renderer 216 may be configured to render the plurality of flat layers in each video fragment of the encoded 360° VR video as a plurality of concentric spherical layers projected at the VR display 202 at a plurality of depth values with respect to a user viewpoint. The plurality of flat layers in each video fragment of the encoded 360° VR video may be rendered as a plurality of concentric spherical layers, based on the image metadata for each flat layer of the plurality of flat layers.

At 510, an audio item may be rendered for a concentric spherical layer of each video fragment of the rendered 360 video, in accordance with a 3D audio position value for the audio item in the concentric spherical layer. The media renderer 216 may be configured to render an audio item for a concentric spherical layer of each video fragment of the rendered 360 video, in accordance with a 3D audio position value for the audio item in the concentric spherical layer.

At 512, a plurality of user inputs that may be associated with a modification of a set of attributes in the image metadata of at least one concentric spherical layer in each video fragment of the rendered 360° VR video may be received. The processor 212 may be configured to receive a plurality of user inputs that may be associated with a modification of a set of attributes in the image metadata of at least one concentric spherical layer in each video fragment of the rendered 360° VR video.

At 514, a modified image metadata may be generated for the at least one concentric spherical layer of the plurality of concentric spherical layers of the video fragment of the rendered 360° VR video, based on modification of the set of attributes of the image metadata associated with the at least one concentric spherical layer of the video fragment. The processor 212 may be configured to generate a modified image metadata for the at least one concentric spherical layer of the plurality of concentric spherical layers of the video fragment of the rendered 360° VR video. The modified image metadata may be generated based on modification of the set of attributes of the image metadata associated with the at least one concentric spherical layer of the video fragment.

At 516, playback of each video fragment rendered as the plurality of concentric spherical layers may be controlled in accordance with the modified image metadata for the at least one concentric spherical layer of each video fragment of the rendered 360° VR video. The playback controller 218 may be configured to control playback of each video fragment rendered as the plurality of concentric spherical layers in accordance with the modified image metadata for the at least one concentric spherical layer of each video fragment of the rendered 360° VR video. Control passes to end.

Various embodiments of the disclosure may provide a non-transitory computer readable medium and/or storage medium, and/or a non-transitory machine readable medium and/or storage medium with a machine code and/or a set of instructions stored thereon and executable by a machine and/or a computer for VR media content generation in a multi-layer structure and interactive playback of the generated VR media content in the multi-layer structure. The set of instructions in the VR device 102 may cause the machine and/or computer to perform the steps for a user-interactive playback of immersive VR content with an adjustable depth of field. The VR device 102 may include the VR playback circuitry 200, the VR display 202, and the memory 210. The memory 210 may be configured to store an encoded 360° VR video that may include a sequence of video fragments. Each video fragment may include a plurality of flat layers and each flat layer of the plurality of flat layers may be at least one equirectangular image frame that is associated with an image metadata. The VR playback circuitry 200 may be configured to render the plurality of flat layers in each video fragment of the encoded 360° VR video as a plurality of concentric spherical layers projected at the VR display at a plurality of depth values with respect to a user viewpoint. The plurality of flat layers may be rendered as the plurality of concentric spherical layers, based on the image metadata for each flat layer of the plurality of flat layers. The VR playback circuitry 200 may be further configured to receive a plurality of user inputs associated with a modification of a set of attributes in the image metadata. The plurality of user inputs for the modification of the set of attributes in the image metadata may be associated with at least one concentric spherical layer of the plurality of concentric spherical layers in each video fragment of the rendered 360° VR video. The VR playback circuitry 200 may be configured to generate a modified image metadata for the at least one concentric spherical layer of the plurality of concentric spherical layers of the video fragment of the rendered 360° VR video. The modified image metadata may be generated based on modification of the set of attributes of the image metadata associated with the at least one concentric spherical layer of the video fragment. The VR playback circuitry 200 may be further configured to control playback of each video fragment rendered as the plurality of concentric spherical layers in accordance with the modified image metadata for the at least one concentric spherical layer of each video fragment of the rendered 360° VR video. The playback of each video fragment may be controlled based on user selection of the set of attributes in the image metadata associated with the at least one concentric spherical layer of the video fragment.

Various embodiments of the present disclosure may be found in a method and a VR device for a user-interactive playback of immersive VR content with an adjustable depth of field. The VR device may include a VR display, a memory, and a VR playback circuitry. The memory may be configured to store an encoded 360° VR video that may include a sequence of video fragments. Each video fragment may include a plurality of flat layers and each flat layer of the plurality of flat layers may be at least one equirectangular image frame that is associated with an image metadata. The VR playback circuitry is configured to render the plurality of flat layers in each video fragment of the encoded 360° VR video as a plurality of concentric spherical layers projected at the VR display at a plurality of depth values with respect to a user viewpoint. The plurality of flat layers may be rendered as the plurality of concentric spherical layers, based on the image metadata for each flat layer of the plurality of flat layers. The VR playback circuitry may be further configured to receive a plurality of user inputs associated with a modification of a set of attributes in the image metadata. The plurality of user inputs for the modification of the set of attributes in the image metadata may be associated with at least one concentric spherical layer of the plurality of concentric spherical layers in each video fragment of the rendered 360° VR video. The VR playback circuitry may be configured to generate a modified image metadata for the at least one concentric spherical layer of the plurality of concentric spherical layers of the video fragment of the rendered 360° VR video. The modified image metadata may be generated based on modification of the set of attributes of the image metadata associated with the at least one concentric spherical layer of the video fragment. The VR playback circuitry may be further configured to control playback of each video fragment rendered as the plurality of concentric spherical layers in accordance with the modified image metadata for the at least one concentric spherical layer of each video fragment of the rendered 360° VR video. The playback of each video fragment may be controlled based on user selection of the set of attributes in the image metadata associated with the at least one concentric spherical layer of the video fragment.

In accordance with an embodiment, the VR playback circuitry may be configured to generate a decoded 360° VR video by decompression of the plurality of flat layers and the image metadata for each flat layer of the encoded video fragment of the encoded 360° VR video. The set of attributes in the image metadata for each flat layer may include layer information associated with a layer type, a depth value, a three dimensional (3D) audio position value, an alpha value, and media player-specific information, which may be utilized to render each flat layer as a concentric spherical layer.

In accordance with an embodiment, the plurality of concentric spherical layers may include a background spherical layer and a plurality of spherical item layers. The VR playback circuitry may be further configured to render the background spherical layer as an outermost concentric spherical layer of the plurality of concentric spherical layers. The background spherical layer may be associated with a depth value that is a maximum of the plurality of depth values specified for the plurality of flat layers in each video fragment of a decoded 360° VR video. Similarly, the VR playback circuitry may be further configured to render each of the plurality of spherical item layers as an inner concentric spherical layer of the plurality of concentric spherical layers. The plurality of spherical item layers may include at least one of a graphic image, textual content, an interactive button, a user interface, a 3D depth texture, a computer-generated imagery (CGI), or an animation sequence. A depth value for each flat layer of each video fragment may correspond to a radius of a concentric spherical layer measured with respect to the user viewpoint.

In accordance with an embodiment, the VR playback circuitry may be further configured to render an audio item for a concentric spherical layer of each video fragment of the rendered 360° VR video, in accordance with a 3D audio position value for the audio item of the concentric spherical layer. The plurality of user inputs may include at least one of a touch input, a haptic input, a gesture input, a voice input, a head-rotation input, or an eye movement input, and a pupil dilation input.

In accordance with an embodiment, the modification of the set of attributes of the image metadata for the at least one concentric spherical layer of the video fragment may correspond to a modification of the at least one concentric spherical layer of the video fragment during the playback of the rendered 360° VR video. The controlled playback of each video fragment in accordance with the modified image metadata may correspond to at least one of a switch in a position, a modification of content, a modification of an audio depth perception and a direction of audio perception, or a level of transparency of different concentric spherical layers of each video fragment in the rendered 360° VR video.

In accordance with an embodiment, the VR playback circuitry may be configured to switch a position of different concentric spherical layers of each video fragment of the rendered 360° VR video in accordance with a modification of a depth value for the different concentric spherical layers in the modified image metadata. The switch may be done based on the receipt of a user input for the modification of the depth value for the different concentric spherical layers. The VR playback circuitry may be further configured to modify content of different concentric spherical layers of each video fragment of the decoded 360° VR video in accordance with modification of a layer type in the image metadata for the different concentric spherical layers. The modification may be done based on the receipt of a user input for the modification of the layer type for the different concentric spherical layers.

In accordance with an embodiment, the VR playback circuitry may be further configured to modify an audio depth perception and a direction of audio perception of different audio items for different concentric spherical layers of each video fragment. The modification in the audio depth perception and the direction of audio perception may be done in accordance with a modification of a 3D audio position value for the different concentric spherical layers of each video fragment of a decoded 360° VR video. The modification is based on the receipt of a user input for the modification of the 3D audio position value for the different concentric spherical layers. The audio depth perception and the direction of audio perception of different audio items for different concentric spherical layers of each video fragment is modified further based on a change in a point of gaze of the user on the different concentric spherical layers of each video fragment at the VR display, in accordance with a movement of eyes of the user.

In accordance with an embodiment, the VR playback circuitry may be further configured to modify a level of transparency of different concentric spherical layers of each video fragment of the rendered 360° VR video. Such modification may be done in accordance with a modification of an alpha value of the different concentric spherical layers. The modification may be done based on the receipt of a user input for the modification of the alpha value for the different concentric spherical layers.

In accordance with an embodiment, the VR playback circuitry may be further configured to render the plurality of concentric spherical layers in each video fragment of the 360° VR video as a plurality of voxels in a volume aligned with a view plane of the user. A depth of field may be further added to the plurality of voxels by application of a technique based on volumetric texture rendering.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A virtual reality (VR) device, comprising:
   a VR display;
   a memory configured to store an encoded 360° VR video that comprises a sequence of video fragments,
      wherein each video fragment of the sequence of video fragments comprises a plurality of flat layers, and
      wherein each flat layer of the plurality of flat layers is at least one equirectangular image frame associated with an image metadata; and
   VR playback circuitry, wherein the VR playback circuitry is configured to:
      render the plurality of flat layers in each video fragment of the encoded 360° VR video as a plurality of concentric spherical layers projected at the VR display at a plurality of depth values with respect to a user viewpoint, based on the image metadata for each flat layer of the plurality of flat layers;
      receive a plurality of user inputs associated with a modification of a set of attributes in the image metadata associated with at least one concentric spherical layer of the plurality of concentric spherical layers in each video fragment of the rendered 360° VR video;
      generate a modified image metadata for the at least one concentric spherical layer of the plurality of concentric spherical layers of the video fragment of the rendered 360° VR video, based on modification of the set of attributes of the image metadata associated with the at least one concentric spherical layer of the video fragment; and
      control playback of each video fragment rendered as the plurality of concentric spherical layers in accordance with the modified image metadata for the at least one concentric spherical layer of each video fragment of the rendered 360° VR video, wherein the playback of each video fragment is controlled based on user selection of the set of attributes in the image metadata associated with the at least one concentric spherical layer of the video fragment.

2. The VR device according to claim 1, wherein the VR playback circuitry is further configured to generate a decoded 360° VR video by decompression of the plurality of flat layers and the image metadata for each flat layer of the encoded video fragment of the encoded 360° VR video.

3. The VR device according to claim 1, wherein the set of attributes in the image metadata for each flat layer comprises layer information associated with a layer type, a depth value, a three dimensional (3D) audio position value, an alpha value, and media player-specific information, which is utilized to render each flat layer as a concentric spherical layer.

4. The VR device according to claim 1, wherein the plurality of concentric spherical layers comprises a background spherical layer and a plurality of spherical item layers.

5. The VR device according to claim 4, wherein the VR playback circuitry is further configured to render the background spherical layer as an outermost concentric spherical layer of the plurality of concentric spherical layers.

6. The VR device according to claim 5, wherein the background spherical layer is associated with a depth value that is a maximum of the plurality of depth values specified for the plurality of flat layers in each video fragment of a decoded 360° VR video.

7. The VR device according to claim 4, wherein the VR playback circuitry is further configured to render each of the plurality of spherical item layers as an inner concentric spherical layer of the plurality of concentric spherical layers.

8. The VR device according to claim 7, wherein the plurality of spherical item layers comprises at least one of a graphic image, textual content, an interactive button, a user interface, a 3D depth texture, a computer-generated imagery (CGI), or an animation sequence.

9. The VR device according to claim 1, wherein a depth value for each flat layer of each video fragment corresponds to a radius of a concentric spherical layer measured with respect to the user viewpoint.

10. The VR device according to claim 1, wherein the VR playback circuitry is further configured to render an audio item for a concentric spherical layer of each video fragment of the rendered 360° VR video, in accordance with a 3D audio position value for the audio item of the concentric spherical layer.

11. The VR device according to claim 1, wherein the plurality of user inputs comprises at least one of a touch input, a haptic input, a gesture input, a voice input, a head-rotation input, or an eye movement input, and a pupil dilation input.

12. The VR device according to claim 1, wherein the modification of the set of attributes of the image metadata for the at least one concentric spherical layer of the video fragment corresponds to a modification of the at least one concentric spherical layer of the video fragment during the playback of the rendered 360° VR video.

13. The VR device according to claim 1, wherein the VR playback circuitry is further configured to switch a position of different concentric spherical layers of each video fragment of the rendered 360° VR video in accordance with a modification of a depth value for the different concentric spherical layers in the modified image metadata, wherein the switch is based on the receipt of a user input for the modification of the depth value for the different concentric spherical layers.

14. The VR device according to claim 1, wherein the VR playback circuitry is further configured to modify content of different concentric spherical layers of each video fragment of the rendered 360° VR video in accordance with a modification of a layer type in the image metadata for the different concentric spherical layers, wherein the modification is based on the receipt of a user input for the modification of the layer type for the different concentric spherical layers.

15. The VR device according to claim 1, wherein the VR playback circuitry is further configured to modify a depth of audio perception and a direction of audio perception of different audio items for different concentric spherical layers of each video fragment, in accordance with a modification of a 3D audio position value for the different concentric spherical layers of each video fragment of the rendered 360° VR video, wherein the modification is based on the receipt of a user input for the modification of the 3D audio position value for the different concentric spherical layers.

16. The VR device according to claim 15, wherein the audio depth perception and the direction of audio perception of different audio items for different concentric spherical layers of each video fragment is modified further based on a change in a point of gaze of a user on the different concentric spherical layers of each video fragment at the VR display, in accordance with movement of eyes of the user.

17. The VR device according to claim 1, wherein the VR playback circuitry is further configured to modify a level of transparency of different concentric spherical layers of each video fragment of the rendered 360° VR video, in accordance with a modification of an alpha value of the different concentric spherical layers, and wherein the modification is based on the receipt of a user input for the modification of the alpha value for the different concentric spherical layers.

18. The VR device according to claim 1, wherein the controlled playback of each video fragment in accordance with the modified image metadata corresponds to at least one of a switch in a position, a modification of content, a modification of an audio depth perception and a direction of audio perception, or a level of transparency of different concentric spherical layers of each video fragment in the rendered 360° VR video.

19. The VR device according to claim 1, wherein the VR playback circuitry is further configured to render the plurality of concentric spherical layers in each video fragment of the 360° VR video as a plurality of voxels in a volume aligned with a view plane of a user, wherein a depth of field is added to the plurality of voxels by application of a technique based on volumetric texture rendering.

20. A method, comprising:
  in a virtual reality (VR) device that comprises a VR display, a memory, and VR playback circuitry:
    storing, in the memory, an encoded 360° VR video that comprises a sequence of video fragments, wherein each video fragment comprises a plurality of flat layers, wherein each flat layer of the plurality of flat layers is at least one equirectangular image frame associated with an image metadata
    rendering, by the VR playback circuitry, the plurality of flat layers in each video fragment of a decoded 360° VR video as a plurality of concentric spherical layers projected at the VR display at a plurality of depth values with respect to a viewpoint of a user, based on the image metadata for each flat layer of the plurality of flat layers;
    receiving, by the VR playback circuitry, a plurality of user inputs associated with a modification of a set of attributes in the image metadata associated with at least one concentric spherical layer of the plurality of concentric spherical layers in each video fragment of the rendered 360° VR video;
    generating, by the VR playback circuitry, a modified image metadata for the at least one concentric spherical layer of the plurality of concentric spherical layers of the video fragment of the rendered 360° VR video, based on modification of the set of attributes of the image metadata associated with the at least one concentric spherical layer of the video fragment; and
    controlling, by the VR playback circuitry, playback of each video fragment rendered as the plurality of concentric spherical layers in accordance with the modified image metadata for the at least one concentric spherical layer of each video fragment of the rendered 360° VR video, wherein the playback of each video fragment is controlled based on user selection of the set of attributes in the image metadata associated with the at least one concentric spherical layer of the video fragment.

* * * * *